(12) United States Patent
Lee et al.

(10) Patent No.: US 11,002,976 B2
(45) Date of Patent: May 11, 2021

(54) FAR-INFRARED EMITTER

(71) Applicant: National Taiwan University of Science and Technology, Taipei (TW)

(72) Inventors: San-Liang Lee, Taipei (TW); Ling-Hsiu Hung, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 172 days.

(21) Appl. No.: 16/182,809

(22) Filed: Nov. 7, 2018

(65) Prior Publication Data

US 2020/0018980 A1 Jan. 16, 2020

(30) Foreign Application Priority Data

Jul. 16, 2018 (TW) .................................. 107124431

(51) Int. Cl.
*G02B 27/09* (2006.01)
*G02B 5/20* (2006.01)

(52) U.S. Cl.
CPC ......... *G02B 27/0938* (2013.01); *G02B 5/208* (2013.01); *G02B 27/0955* (2013.01); *G02B 27/0977* (2013.01)

(58) Field of Classification Search
CPC ............ G02B 27/0938; G02B 27/0955; G02B 27/0977; G02B 27/0944; G02B 27/095; G02B 27/0961; G02B 27/0966; G02B 27/0972; G02B 27/0983; G02B 5/208
See application file for complete search history.

(56) References Cited

U.S. PATENT DOCUMENTS

| | | | | |
|---|---|---|---|---|
| 4,178,514 A * | 12/1979 | Bly | ............................ | F41J 2/02 250/493.1 |
| 4,475,793 A * | 10/1984 | Ford | .................. | G02B 17/0668 359/618 |
| 4,791,427 A * | 12/1988 | Raber | ...................... | H01Q 3/14 343/725 |
| 2009/0309029 A1* | 12/2009 | Zhevelev | ................. | G02B 5/22 250/353 |
| 2011/0109880 A1* | 5/2011 | Nummela | .............. | A61B 3/113 351/210 |
| 2014/0364743 A1* | 12/2014 | Godavarty | ......... | G01N 21/6456 600/473 |

OTHER PUBLICATIONS

Tsai et al., Biological effects and medical applications of infrared radiation, J Photochem Photobiol B. May 2017, 170: 197-207 (Year: 2017).*
DiOptika, Laser Beam Expanders 3-5 micron & 8-12 micron, http://www.dioptika.com/Laser%20Beam%20Expander%203micron%20to%205micron%20Beam-Expander.html, available online as of 2007, accessed Jun. 30, 2020 (Year: 2007).*
Spoptics, Infrared Long Pass Filter, http://www.optical-coating.com/filter-infrared1.html, available online as of 2012, accessed Jun. 30, 2020 (Year: 2012).*

* cited by examiner

*Primary Examiner* — Stephone B Allen
*Assistant Examiner* — Adam W Booher
(74) *Attorney, Agent, or Firm* — WPAT, PC

(57) ABSTRACT

A far-infrared (FIR) emitter includes at least one far-infrared source for generating a far-infrared beam, a filter unit for filtering a wavelength range of the far-infrared beam, and a beam-expanding unit for expanding the far-infrared beam. The FIR emitter can generate a FIR light of a specific wavelength range to cover an expanded projection area.

7 Claims, 6 Drawing Sheets

FAR-INFRARED EMITTER

CROSS REFERENCE TO RELATED APPLICATION

This application claims the benefit of Taiwan Patent Application Serial No. 107124431, filed on Jul. 16, 2018, the subject matter of which is incorporated herein by reference.

BACKGROUND OF THE INVENTION

(1) Field of the Invention

The invention relates to a far-infrared emitter, and more particularly to the far-infrared emitter that can provide low energy consumption, a high optical power density and a broader and more even-distributed radiation area by integrating wave filtering and expanding designs.

(2) Description of the Prior Art

The infrared is one of electromagnetic waves having a wavelength fallen between that of the micro wave and that of the visible light (i.e., within a wave band of wavelengths between 760 nm and 1 cm). Namely, the infrared is an invisible light having a wavelength longer than that of the red light. Generally, under the room temperature, heat radiation from a normal object is usually to provide lights within the aforesaid wave band. Applications of far-infrared are widely seen in industry, military, science, medicine and so on. For example, a typical thermal imaging device can detect temperature distribution patterns over a heat object, and can further perform an infrared strength analysis thereupon so as to present a corresponding thermal image.

Since recent awareness in environmental protection, the infrared spectrometer becomes popular in observing uptake of pollutants in the atmosphere or water. According to wavelengths, near-infrared has a wavelength range of about 0.7~2 µm, mid-infrared has a wavelength range of about 3~5 µm, and far-infrared has a wavelength range of mainly about 6~8 µm and up. Nowadays, in many documents, it has been proved that the far-infrared emitted by specific medical equipment can be positive to some organisms, promote blood circulation, improve metabolism, and contribute to the growth and regrowth of tissues.

In some infrared emitters for nursing uses, advantages in removing human fatigues, improving blood circulation and lessening muscle pains can be found. These infrared emitters usually provide light beams with wavelengths from near-infrared to far-infrared, but generally go with problems in high temperatures and high power consumption. Temperature rise during the far-infrared radiation is mainly caused by the light source of near-infrared or mid-infrared. Nevertheless, while the far-infrared emitter is used for nursing cares, the light source should be a pure far-infrared ideally. In a typical application of blackbody radiation to produce infrared, pure far-infrared is seldom provided, and a filtration to remove short-wavelength infrared is generally necessary.

Further, in conventional far-infrared emitters, though a broader radiation area can be provided, yet disadvantages in cumbersome volumes, high energy consumption, and poor mobility do exist. In addition, the conventional far-infrared radiation equipment usually adopts a large-size ceramic heat plate or carbon-fiber materials, and thus it is inevitable to consume more energy, produce high temperatures, and cause a burn or discomfort risk after a long-term radiation. In the case that the far-infrared radiation is only provided to limited portions, then waste in such a radiation is definite. Also, since the conventional filtering plate for truncating specific wavelengths of far-infrared is expensive, so a small-area far-infrared source furnished with a far-infrared filter is usually applied to output light beams to be further expanded for irradiating a broader surface. Definitely, the usage of small-area far-infrared source also implies low energy consumption.

Hence, the topic to provide a far-infrared emitter that can consume less power, provide higher optical power density, and irradiate homogeneously onto a specific area is definitely urgent to be resolved for the skilled in the art.

SUMMARY OF THE INVENTION

Accordingly, it is an object of the present invention to provide a far-infrared emitter that includes at least one far-infrared source for generating a first far-infrared beam, a filter unit and a beam-expanding unit.

The filter unit, located on a pathway of the first far-infrared beam, is one of a filter and a filtering plate to filter out lights with wavelengths equal to or smaller than 6 µm from the first far-infrared beam so as to form a second far-infrared beam.

The beam-expanding unit allows the second far-infrared beam to pass through, and is to expand the second far-infrared beam into a third far-infrared beam.

All these objects are achieved by the far-infrared emitter described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a far-infrared emitter. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
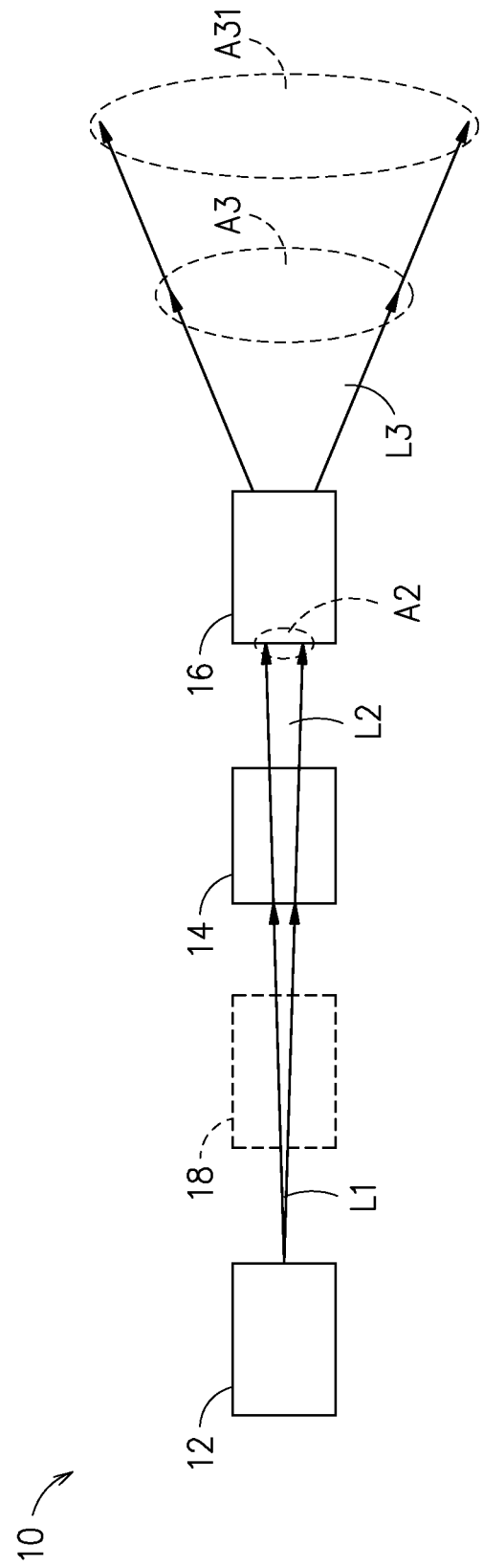
FIG. 1 demonstrates schematically a preferred arrangement of the far-infrared emitter in accordance with the present invention.

Referring now to FIG. 1, the far-infrared emitter 10 includes a far-infrared source 12, a filter unit 14 and a beam-expanding unit 16.

The far-infrared source 12 for generating a first far-infrared beam L1 is a light source that can heat to provide efficiently the far-infrared. The far-infrared source 12, formed by a material able to be heated and thus generate far-infrared, can be a semiconductor chip, a ceramic substrate, a coil or filament, a micro electromechanical chip, a carbon fiber or any material the like. Alternatively, the far-infrared source 12 can be a far-infrared LED or a far-infrared laser. In the present invention, the far-infrared source 12 is not limited to any of the aforesaid light patterns, but is determined only according to practical requirements.

The filter unit 14, located on the pathway of the first far-infrared beam L1, is to modify a wavelength range of the first far-infrared beam L1 so as to form a second far-infrared beam L2. Patterns of the filter unit 14, as well as the wavelengths to be truncated or filtered out, are not limited, but decided only according to practical requirements. The filter unit 14 can truncate the wave band that results in high temperatures, can remove a predetermined range of wavelengths, or can filter out lights with smaller wavelengths. For example, the filter unit 14 can adopt a filter or a filtering plate that can block the far-infrared beams with wavelengths equal to or less than 6 μm. It shall be explained that, in FIG. 1, only one far-infrared source 12 is seen. However, in accordance with the present invention, a plurality of far-infrared sources 12 can be possible, and each of the far-infrared source 12 can produce a corresponding far-infrared beam. These far-infrared beams produced individually by the plurality of far-infrared sources 12 can be then collected to form the aforesaid first far-infrared beam L1 to pass through thereafter the filter unit 14.

The beam-expanding unit 16 for the second far-infrared beam L2 to penetrate through is to expand the second far-infrared beam L2 into a third far-infrared beam L3. As shown, a projection area A3 of the third far-infrared beam L3 is larger than a projection area A2 of the second far-infrared beam L2. Practically, according to different distances between the beam-expanding unit 16 and the target object (not shown in the figure), the corresponding projection areas A3 would be different. For example, when the target object is distant to the beam-expanding unit 16, a projection area A31 larger than the projection area A3 can be formed. On the other hand, if the target object is close to the beam-expanding unit 16, the resulted projection area would be smaller than the projection area A3.

In addition, as shown in FIG. 1, an insulation unit 18 can be included between the far-infrared source 12 and the filter unit 14, by which possible heat conduction between the far-infrared source 12 and the target object can be blocked. However, it shall be understood that the inclusion of the insulation unit 18 is not necessary, but depends on, for example, the packaging of the far-infrared source 12 and the corresponding electrical heat.

Figure 2:
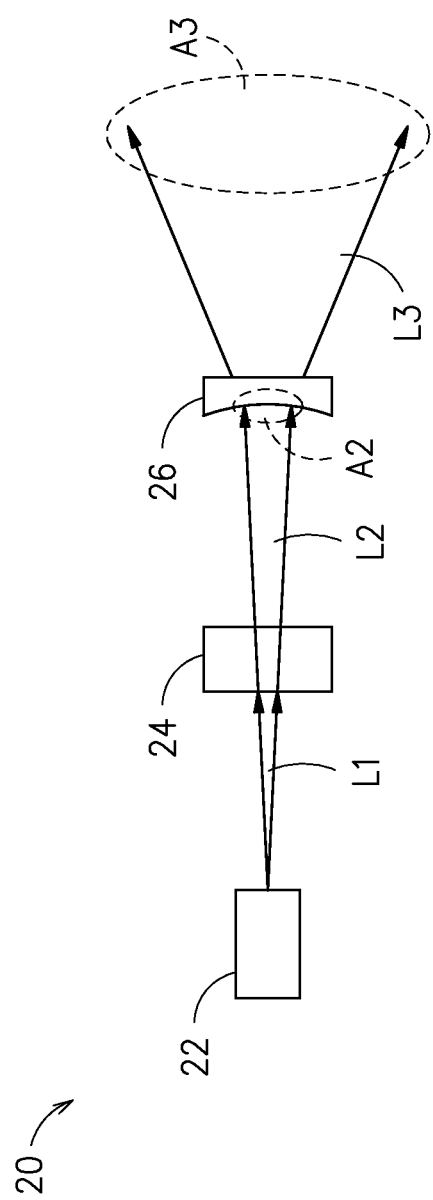
FIG. 2 is a schematic view of an embodiment of FIG. 1.

Referring now to FIG. 2, the far-infrared emitter 20, herein, includes a far-infrared source 22, a filter unit 24 and a beam-expanding unit 26. The far-infrared source 22 is to produce a first far-infrared beam L1. The filter unit 24 is to filter out a specific wavelength range of the first far-infrared beam L1 so as to form a second far-infrared beam L2. In this embodiment, the beam-expanding unit 26 is a transmissive lens. After the second far-infrared beam L2 passes through the transmissive lens (beam-expanding unit 26), the projection area thereof can be expanded so as to form a third far-infrared beam L3, where a projection area A3 of the third far-infrared beam L3 is larger than the projection area A2 of the second far-infrared beam L2. In the present invention, the spec of the transmissive lens 26 can be varied according to practical requirements of the radiation area.

Figure 3:
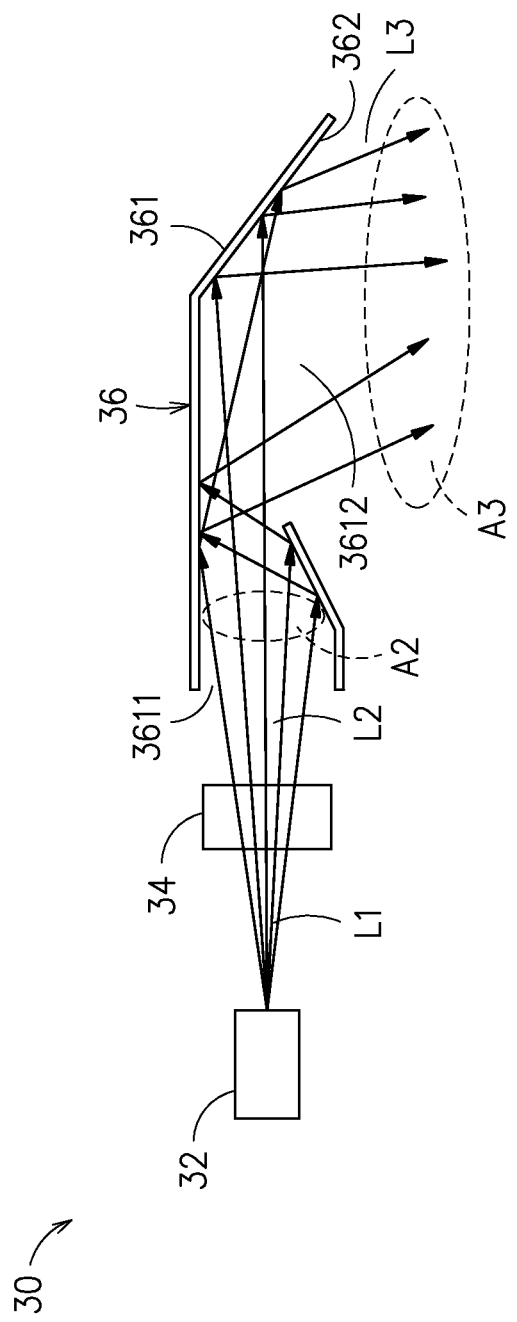
FIG. 3 is a schematic view of another embodiment of FIG. 1.

Referring now to FIG. 3, the far-infrared emitter 30, herein, includes a far-infrared source 32, a filter unit 34 and a beam-expanding unit 36. The far-infrared source 32 generates a first far-infrared beam L1. The filter unit 34 is to remove lights with wavelengths within a specific wavelength range from the first far-infrared beam L1, so as to form a second far-infrared beam L2. The beam-expanding unit 36 is to expand the second far-infrared beam L2 into a third far-infrared beam L3.

In this embodiment, the beam-expanding unit 36, as a reflection structure, includes a main reflecting body 361 and a reflection portion 362. The main reflecting body 361 has a light entrance 3611 and a light exit 3612. The reflection portion 362 is constructed inside the main reflecting body 361. In this embodiment, the reflection portion 362 with specific reflectivity is formed on an inner wall of the main reflecting body 361. After the second far-infrared beam L2 enters the main reflecting body 361 via the light entrance 3611 and irradiates the reflection portion 362, it is reflected, in an expanded form shown as the third far-infrared beam L3, to leave the main reflecting body 361 via the light exit 3612. A projection area A3 of the third far-infrared beam L3 is larger than a projection area A2 of the second far-infrared beam L2. In the present invention, the reflection portion 362 can be furnished with a coating with specific reflectivity so as thereby to enhance the reflections of the second far-infrared beam L2. In addition, a homogeneous or uniform radiation area can be obtained by an angular calculation through optical simulations, and the spec of the beam-expanding unit 36 can be decided according to the required radiation area.

Figure 4:
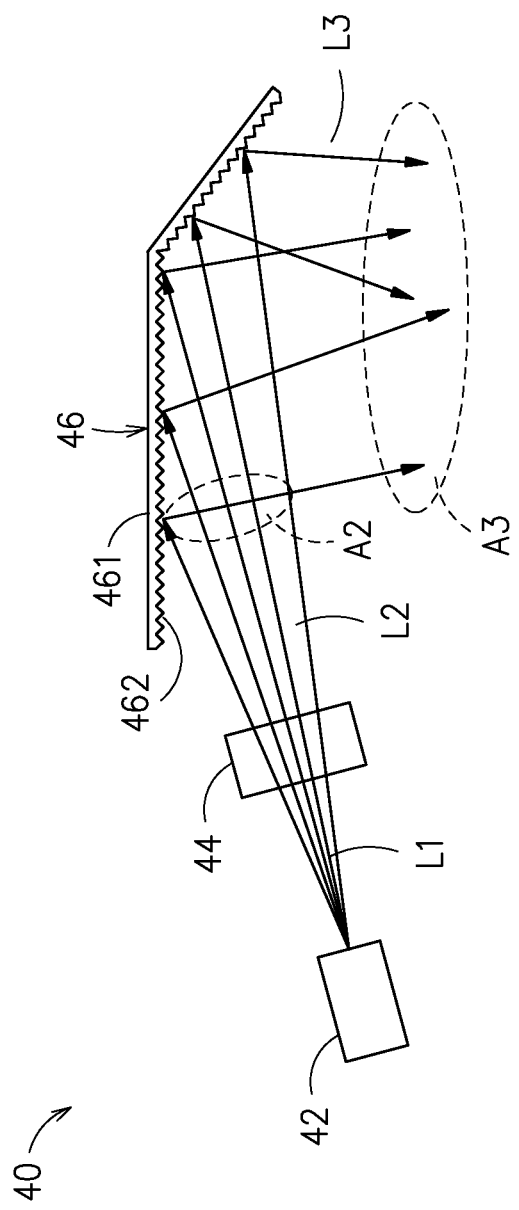
FIG. 4 is a schematic view of a further embodiment of FIG. 1.

Referring now to FIG. 4, the far-infrared emitter 40, herein, includes a far-infrared source 42, a filter unit 44 and a beam-expanding unit 46. The far-infrared source 42 generates a first far-infrared beam L1. The filter unit 44 is to remove lights with wavelengths within a specific wavelength range from the first far-infrared beam L1, so as to form a second far-infrared beam L2. The beam-expanding unit 46 is to expand the second far-infrared beam L2 into a third far-infrared beam L3.

In this embodiment, the beam-expanding unit 46, formed as a reflection structure, includes a main scattering body 461 and a scatter portion 462 constructed on the main scattering body 461. As shown, the scatter portion 462 is furnished with micro structures. In this embodiment, the scatter portion 462 is constructed on a surface of the main scattering body 461. After the second far-infrared beam L2 irradiates the scatter portion 462, the microstructure thereon would scatter the second far-infrared beam L2 and thus expand to form the third far-infrared beam L3. A projection area A3 of the third far-infrared beam L3 is larger than a projection area A2 of the second far-infrared beam L2. In the present invention, the reflection portion 362 can be furnished with a coating with specific reflectivity so as thereby to enhance the reflections of the second far-infrared beam L2. In addition, a homogeneous or uniform radiation area can be obtained by angular calculations through optical pathway simulations upon the far-infrared source 42, the filter unit 44 and/or the beam-expanding unit 46.

Figure 5:
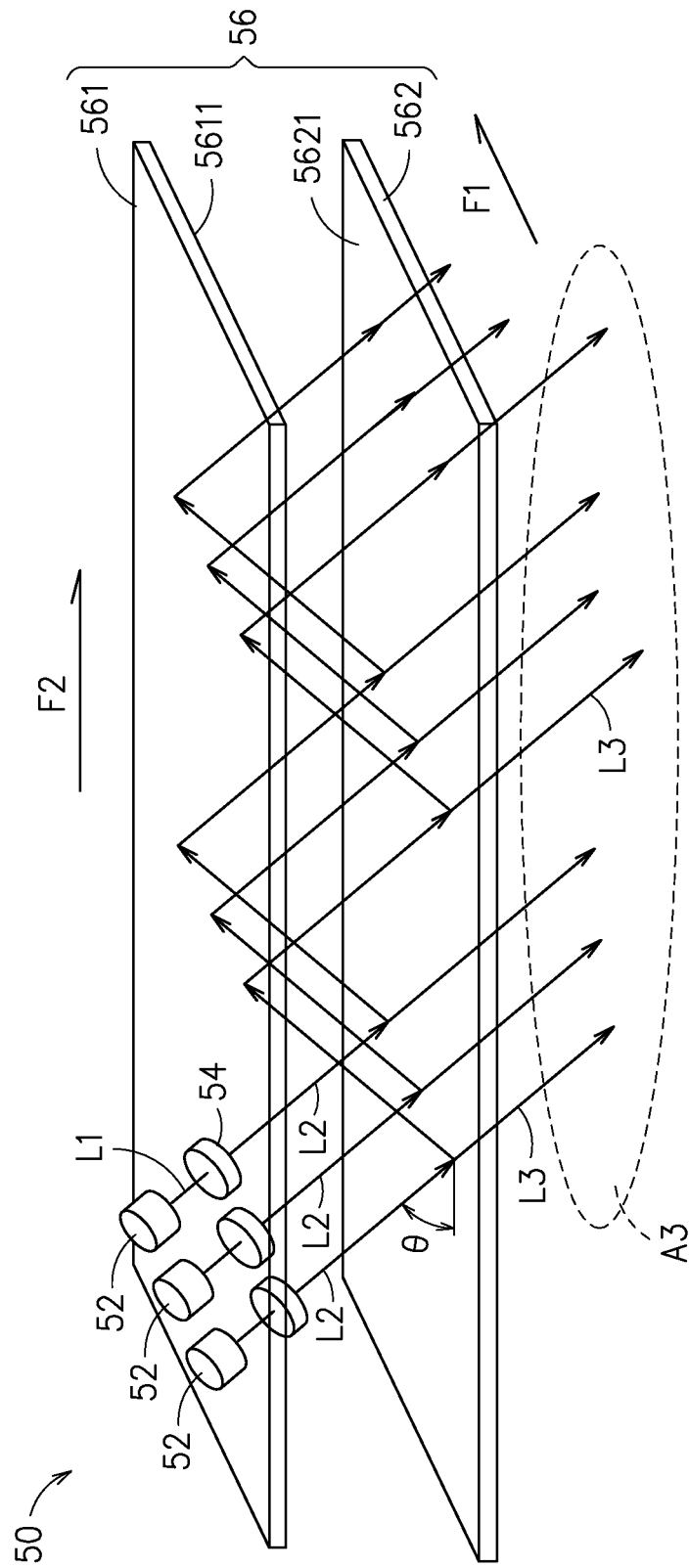
FIG. 5 is a schematic view of one more embodiment of FIG. 1.
Figure 6:
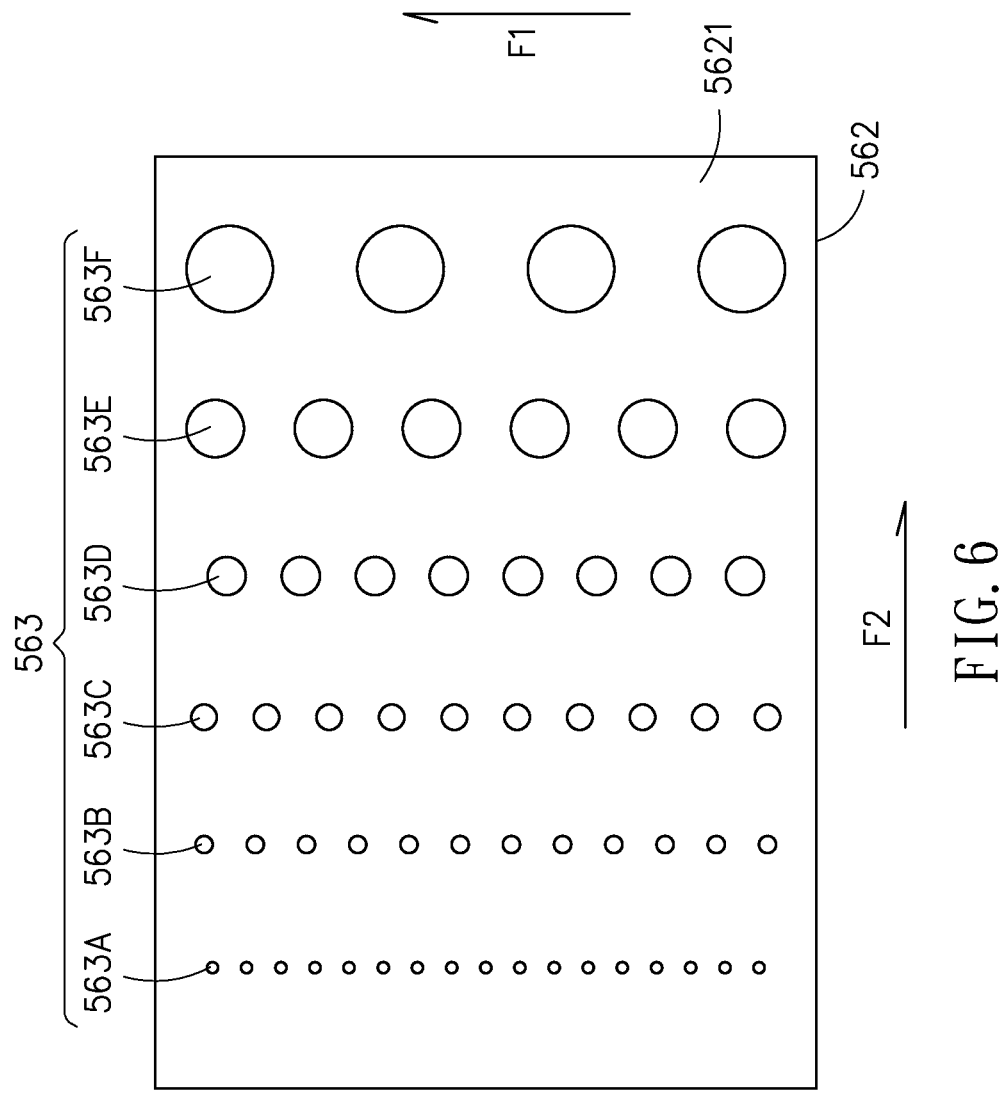
FIG. 6 shows schematically an exemplary embodiment of the micro perforated structure for FIG. 5.

Referring now to FIG. 5, the far-infrared emitter 50, herein, includes a plurality of far-infrared sources 52, a filter unit 54 and a beam-expanding unit 56. The far-infrared sources 52 produce a first far-infrared beam L1. The filter unit 54 is to filter out lights with wavelengths within a specific wavelength range from the first far-infrared beam L1, so as to form a second far-infrared beam L2. The beam-expanding unit 56 is to expand the second far-infrared beam L2 into a third far-infrared beam L3.

In this embodiment, the number of the far-infrared sources 52 in FIG. 5 is, but not limited to, three. In some other embodiments, the number of the far-infrared sources 52 can be two or more than three. In this embodiment, the beam-expanding unit 56, constructed as a multi-reflection structure, is consisted of a main total-reflection body 561 and a main partial-reflection body 562. The main total-reflection body 561 has a total-reflection surface 5611, while the main partial-reflection body 562 has a partial-reflection surface 5621. The total-reflection surface 5611 and the partial-reflection surface 5621 are faced to each other. The main partial-reflection body 562 has micro perforated structures 563. Preferably, the micro perforated structures 563 are formed by plural rows of through holes 563A-563F in a first direction F1 on the main partial-reflection body 562. In a second direction F2 perpendicular to the first direction F1, diameters of the serial through holes 563A-563F become larger and larger. In the present invention, each of the through holes 563A-563F can be shaped as a circle, an oval, a polygon or any irregular shape, and different through holes 563A-563F, even in the same row, can be individually configured.

As described above, in this embodiment, the number of the far-infrared sources 52 is not limited to three. Also, the arrangement of the far-infrared sources 52 is not limited to align in the first direction F1, as shown. An angle θ is formed between the first far-infrared beam L1 (or the second far-infrared beam L2) and the partial-reflection surface 5621, and the angle θ can be, but not limited to, in a range of 0~90°. Alternatively, the far-infrared source 52 can be located to face the total-reflection surface 5611, such that an angle θ can be formed between the first far-infrared beam L1 and the total-reflection surface 5611. Thus, a projection of a propagation direction of the first far-infrared beam L1 on the partial-reflection surface 5621 (or the total-reflection surface 5611) would be largely perpendicular to the first direction F1.

After the second far-infrared beam L2 irradiates the partial-reflection surface 5621, a portion of the second far-infrared beam L2 would undergo reciprocal reflections between the total-reflection surface 5611 and the partial-reflection surface 5621. During the reciprocal reflections, part of the second far-infrared beam L2 would penetrate through the through holes 563A-563F of the micro perforated structure 563 on the main partial-reflection body 562, so as to form the third far-infrared beam L3. A strength of the second far-infrared beam L2 reflected reciprocally between the total-reflection surface 5611 and the partial-reflection surface 5621 would become weaker and weaker during the reciprocal reflections. However, due to the expanding arrangement in diameters of the through hole 563A-563F as described above, a larger and uniform projection area A3 for the third far-infrared beam L3 can be formed.

As described above, different embodiments in FIG. 2 to FIG. 5 have been provided to demonstrate various aspects of the beam-expanding unit in accordance with the present invention. Anyhow, all these beam-expanding units serve the same purpose to expand the projection area of the second far-infrared beam. For example, if a compact and portable design is desired, the far-infrared source in a chip pattern can be used, and typically the resulted infrared beam projection area smaller than 5 cm² can be obtained. Thus, the required projection area of the infrared beam expanded by the beam-expanding unit can be 3 cm×5 cm, for example, and also a uniform optical field can be provided. In addition, in the present invention, the beam-expanding unit (any of 16, 26, 36, 46, 56 in FIG. 1~FIG. 5, respectively) and the filter unit (any of 14, 24, 34, 44, 54 in FIG. 1~FIG. 5, respectively) can be integrated as a single unit to provide simultaneously both light expanding and filtering functions. By having the embodiment shown in FIG. 5 as a typical example, the filter unit 54 can be constructed as a filtering plate or film to be integrated on the main partial-reflection body 562, so that the main partial-reflection body 562 can serve the filtering purpose.

In summary, the far-infrared emitter provided by the present invention can include designs of filters and expanding optical patterns, so as to produce a far-infrared emitter that generates less heat, provides a higher optical power density, and reduces power loss. The emitter with specific wavelengths of far-infrared and a tiny size can provide a uniform expanded projection area (3 cm×5 cm for example), be applicable to a short-distance usage (less than 10 cm) without harming human skins, and thus be relevant to versatile industrial fields. Since the far-infrared emitter is featured in lower power consumption and lower temperatures, it can be easily adopted, for example, by a wearable or portable medical module with far-infrared and micro wave sensors such as the nursing apparatus for washing kidney fistula.

While the present invention has been particularly shown and described with reference to a preferred embodiment, it will be understood by those skilled in the art that various changes in form and detail may be without departing from the spirit and scope of the present invention.

What is claimed is:

1. A far-infrared emitter, comprising:
   at least one far-infrared source for generating a first far-infrared beam;
   a filter unit, located on a pathway of the first far-infrared beam, being one of a filter and a filtering plate to filter out lights with wavelengths equal to or smaller than 6 μm from the first far-infrared beam so as to form a second far-infrared beam; and
   a beam-expanding unit, allowing the second far-infrared beam to pass through, being to expand the second far-infrared beam into a third far-infrared beam, wherein the beam-expanding unit is formed as a multi-reflection structure comprising:
      a main total-reflection body, having a total-reflection surface; and
      a main partial-reflection body, having a partial-reflection surface, the total-reflection surface and the partial-reflection surface facing each other, the main partial-reflection body having a micro perforated structure;
   wherein, after the second far-infrared beam irradiates the multi-reflection structure, a portion of the second far-infrared beam is reflected by the main partial-reflection body to irradiate the main total-reflection body, and part of the portion of the second far-infrared beam penetrates through the micro perforated structure to form the third far-infrared beam.

2. The far-infrared emitter of claim 1, wherein the at least one far-infrared source, formed by a material able to be heated and thus generate far-infrared, is one of a semiconductor chip, a ceramic substrate, a coil or filament, a micro electromechanical chip, a carbon fiber, a far-infrared LED, and a far-infrared laser.

3. The far-infrared emitter of claim 1, wherein an angle between the first far-infrared beam and the partial-reflection surface or the total-reflection surface has a range of 0-90°.

4. The far-infrared emitter of claim 1, wherein the micro perforated structures are formed by plural rows of through holes in a first direction on the main partial-reflection body, and diameters of the through holes become larger and larger in a second direction perpendicular to the first direction.

5. The far-infrared emitter of claim 4, wherein a projection of a propagation direction of the first far-infrared beam on the partial-reflection surface or the total-reflection surface is largely perpendicular to the first direction.

6. The far-infrared emitter of claim 1, further including an insulation unit located between the at least one far-infrared source and the filter unit, for insulating heat conduction between the at least one far-infrared source and the filter unit.

7. The far-infrared emitter of claim 1, wherein the beam-expanding unit and the filter unit are integrated as a single unit to provide simultaneously light expanding and filtering functions.

\* \* \* \* \*